United States Patent [19]
Smith

[11] 3,874,041
[45] Apr. 1, 1975

[54] FASTENERS
[75] Inventor: Howard J. L. Smith, Farnham, England
[73] Assignee: Dzus Fastener Co. Inc., West Islip, N.Y.
[22] Filed: Apr. 26, 1974
[21] Appl. No.: 464,477

Related U.S. Application Data
[63] Continuation of Ser. No. 372,325, June 21, 1973.

[30] Foreign Application Priority Data
June 13, 1972 United Kingdom............ 27646/72

[52] U.S. Cl............................. 24/221 R, 24/73 RM
[51] Int. Cl............................................. A44b 17/00
[58] Field of Search.......... 24/221 R, 221 K, 73 RM

[56] References Cited
UNITED STATES PATENTS

| | | | |
|---|---|---|---|
| 2,347,675 | 5/1944 | Dzus | 24/221 A |
| 2,372,496 | 3/1945 | Huelster | 24/221 A |
| 2,695,046 | 11/1954 | Tinnerman | 51/41.75 |
| 2,969,511 | 1/1961 | Sande | 24/221 A |
| 3,417,442 | 12/1968 | Smith | 24/221 A |
| 3,504,875 | 4/1970 | Johnson | 24/221 K |
| 3,600,018 | 8/1971 | Dzus | 24/221 A |
| 3,656,466 | 4/1972 | Dzus | 24/221 A |

FOREIGN PATENTS OR APPLICATIONS
585,718  2/1947  United Kingdom............ 24/221 A Primary Examiner—Bernard A. Gelak
Attorney, Agent, or Firm—Kane, Dalsimer, Kane, Sullivan and Kurucz

[57] ABSTRACT

This invention relates to a quick-release fastener for joining together two members, of the kind in which the shank of a stud passes through aligned openings in said members and cooperates by relative rotation with a receptacle assembly. A retaining bar within said receptacle cooperates with said stud and is biased away from said stud by one or more spring washers.

6 Claims, 3 Drawing Figures

FASTENERS

This is a continuation of application Ser. No. 372,325, filed June 21, 1973.

This invention relates to quick-release fasteners, which are used for holding together two panels face to face, and which consist of two parts, a stud and a receptacle assembly. In use, a shank of the stud passes through aligned holes in the two panels and cooperates by relative rotation with the receptacle assembly which is secured to the back of the second of the two panels. The stud may be captive, but is rotatable in the opening in the first of the two panels. With fasteners of this type the two panels may be secured together without providing access to the receptacle assembly at the back of the second panel.

In the past the receptacle has been secured to the back of the second panel by rivetting, but this is a lengthy operation, and in addition, all three holes in the second panel, one for the stud and two for the rivets, must be very accurately positioned with respect to one another. Fasteners have been proposed, for example as disclosed in U.S. Pat. No. 3,417,442, which avoid the necessity of rivetting the receptacle to its corresponding panel, but these have been bulky and have therefore been of little use in cases when the fastenings need to be very close together.

Therefore, one object of the invention is to provide fasteners small enough to be capable of use with their studs very close to one another, that is to say within a few millimetres of each other, but having the strength of earlier fasteners. Furthermore, these fasteners should be capable of use with a standard panel pieced with square apertures at "International fixing centres".

Thus, according to the present invention a receptacle assembly for use with a stud to provide a quick-release fastener of the kind described comprises a housing arranged to retain the stud, in use the housing being arranged to be mounted at an opening of a panel; a retaining bar, for cooperation with thhe stud, positioned within the housing across the opening in the panel; and at least one spring-washer positioned within the housing acting between the retaining bar and the side of the housing adjacent the panel.

Preferably, the housing has sprung flanges which project through and embrace the edges of the opening in the panel to locate the assembly on the panel. The retaining bar may be incorporated in a plate having a central opening, the bar spanning the opening and being formed integrally with the plate.

In order to allow the receptacle to be mounted on panels of various thicknesses a sprung shim may be provided between the panel and that side of the housing nearest the panel.

The invention also includes a fastener having a receptacle assembly as described above together with a cooperating stud.

One example of a fastener incorporating a receptacle according to the present invention will now be described with reference to the accompanying drawings, in which.

Figure 1:
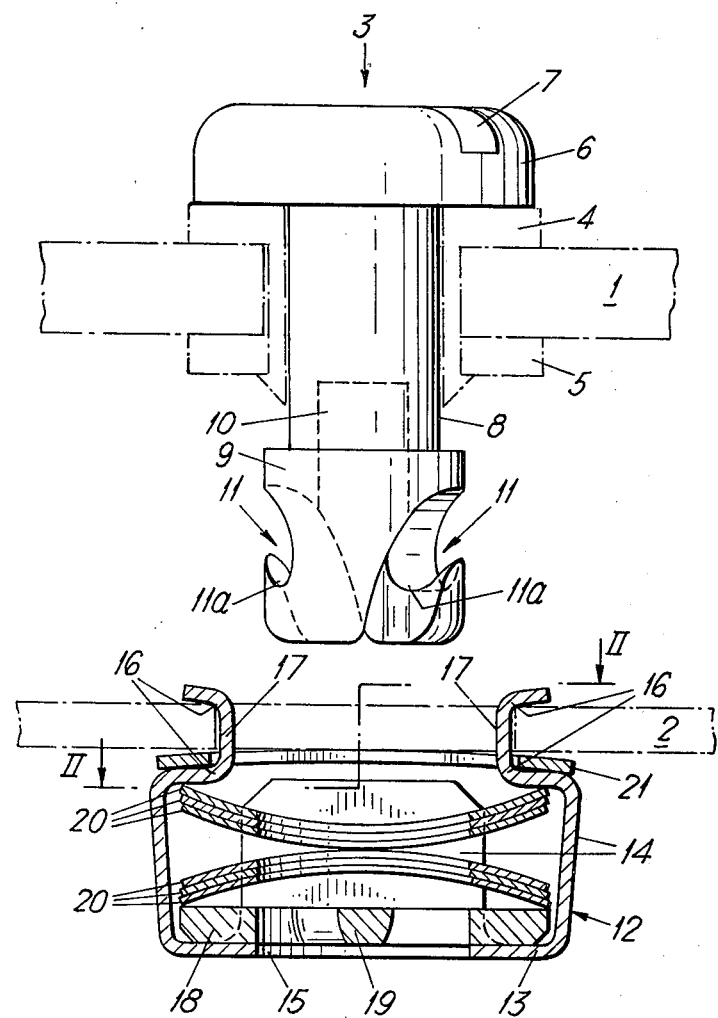
FIG. 1 is a side elevation showing the fastener uncoupled with the receptacle shown in section.
Figure 2:
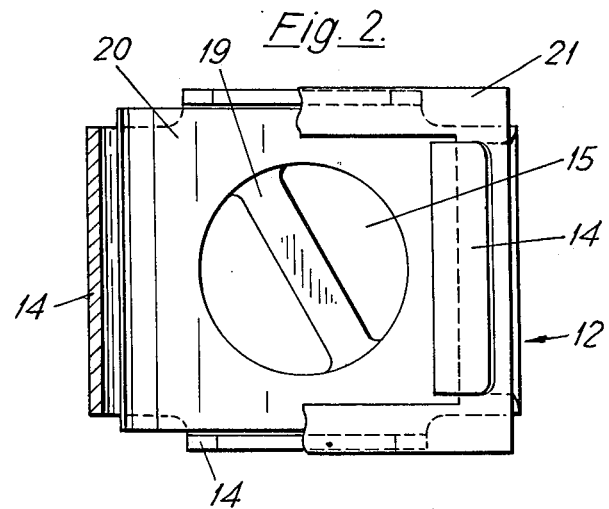
FIG. 2 is a plan view, partially sectioned, of the receptacle.
Figure 3:
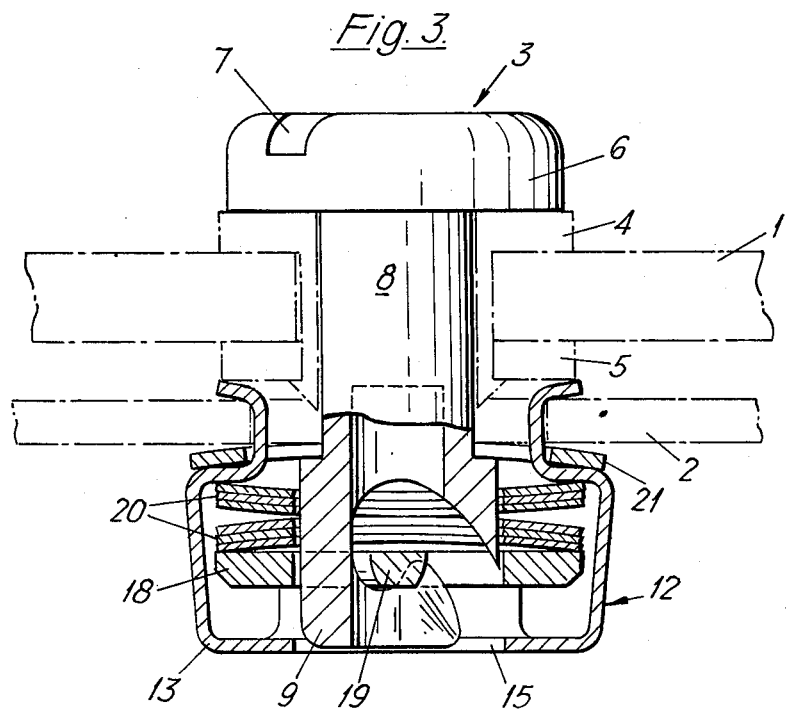
FIG. 3 is a side elevation of the coupled fastener, the receptacle shown in section.

The fastener is shown in use on two panels 1 and 2 which are to be coupled together. A stud 3 is shown, in FIGS. 1 and 3, in position on the first panel 1 and is held in place in an aperture of the panel by two washers 4 and 5 which are snapped into position around a reduced portion of the stud. The stud 3 includes a circular head 6 having a diametrical slot 7 for engagement with a screwdriver head. Extending downwards (as shown) from the head 6 there is a reduced cylindrical shank 8 which may be of any suitable length depending on the range of thicknesses of the panels for use with which the fastener is intended. At the lower end of the shank 8 a further generally cylindrical section 9 is formed which is of larger diameter than the shank 8 and it includes a bore 10 and two inclined cam slots 11 open at the bottom. In use, these slots will engage with a part of the receptacle 12.

The receptacle 12 is formed with a housing 13 which itself is formed from a single cruciform-shaped blank of spring steel the arms 14 of which are bent up to form the sides of the housing. The base of the housing has a circular aperture 15. Two of the arms 14 are longer than the other two and these are further bent at 16 to form spring flanges 17 which in use are shown located around the edges of a square opening in the member 2 to which the receptacle is attached.

Within the housing 12 there is a square plate-like washer 18 having an integral bar 19 extending diametrically across the washers hole. In the uncoupled position (FIG. 1) this square washer 18 is held against the bottom of the housing by six leaf-type spring washers 20 arranged in two groups which are opposed to one another. The spring washers 20, which are also square, act between the side of the housing 12 adjacent the member 2 and the square plate-like washer 18.

One further feature of the receptacle is the provision of a spring shim 21 around the flanges of the receptacle. This shim allows the panel 2 to be of various thicknesses whilst still providing a firm attachment of the receptacle.

In order to attach the two panels 1 and 2 together the stud 3 is inserted into the receptacle 12 and the bar 19 enters the lower end of the bore 10 and the cam slots 11. The stud 3 is then rotated through 90° into the position shown in FIG. 3 and the bar 19 thus rides up over the faces of the cam slots and into a depression 11a formed therein. As the bar is brought into position the square plate-like washer 18 is lifted against the action of the spring washers 20. The compressing of the springs serves to hold the bar 19 in position in the cam slots and the fastener is therefore locked.

Of course, the number of spring washers is variable, depending merely upon the application of the fastener.

I claim:

1. A fastener receptacle for mounting in an aperture in a first part for releasably attaching the first part to a second part by means of a spiral cam fastener stud rotatably mounted in the second part, said fastener receptacle comprising:

a housing made of resilient sheet metal formed with side panels extending downwardly along the sides of the housing and disposed around a central spring chamber with an end opening to receive the end of the fastener stud;

two opposite side panels extending downwardly beyond the other side panels and formed at their ends with spring flanges for engaging the opposite sides of the aperture in the first part to secure the receptacle to said first part;

receiving means in the housing including a retaining bar extending transversely across the center of the receptacle housing for releasable engagement with the spiral cam of the stud;

retention means to prevent rotation of the receiving means with respect to the housing while retaining the receiving means inside the walls of the housing and permitting the receiving means to shift axially inside the walls of the housing and thereby follow the spiral cam surface in the stud when relative rotation occurs therebetween; and a spring positioned inside the housing between the receiving means and the base of the housing and engaging the receiving means for urging the retaining bar in a direction away from the spring flanges and toward the opposite end of the housing.

2. The invention in accordance with claim 1 wherein the housing is formed into a box-like structure with four rectangularly arranged side panels, the receiving means including a plate being relatively flat, having a central opening to receive the end of the fastener stud, and rectangular in configuration so that relative rotation between the plate and the housing is prevented.

3. The invention in accordance with claim 1 wherein the spring is a plurality of leaf-type spring washers positioned inside the housing between the receiving means and the base of the housing.

4. The invention in accordance with claim 1 wherein a relatively flat spring shim is positioned around the spring flanges so that it can be positioned between the first member and the housing.

5. A fastener receptacle for mounting in an aperture in a first part for releasably attaching the first part to a second part by means of a spiral cam fastener stud mounted in the second part, said fastener receptacle comprising:

a housing made of resilient sheet metal formed into a box-like structure with four rectangularly arranged side panels extending downwardly along the sides of the housing and disposed around a central spring chamber with an end opening to receive the end of the fastener stud, two of the opposite side panels extending downwardly beyond the other side panels and formed at their ends with spring flanges for engaging the opposite sides of the said aperture in the first part to secure the receptacle to said first part; a relatively flat rectangular plate positioned in said housing and having a central opening to receive the end of the fastener stud and formed with a retaining bar extending transversely across the center of said receptacle housing for releasable engagement with the spiral cam of the stud; and a plurality of leaf type spring washers positioned inside said housing between the said flat plate and the base of the housing and engaging said flat plate for urging said retaining bar in a direction away from said spring flanges and towards the opposite end of said housing.

6. A fastener receptacle as set forth in claim 5 in which a relatively flat spring shim is positioned around said spring flanges so that it can be positioned between the first member and the housing.

* * * * *